UNITED STATES PATENT OFFICE.

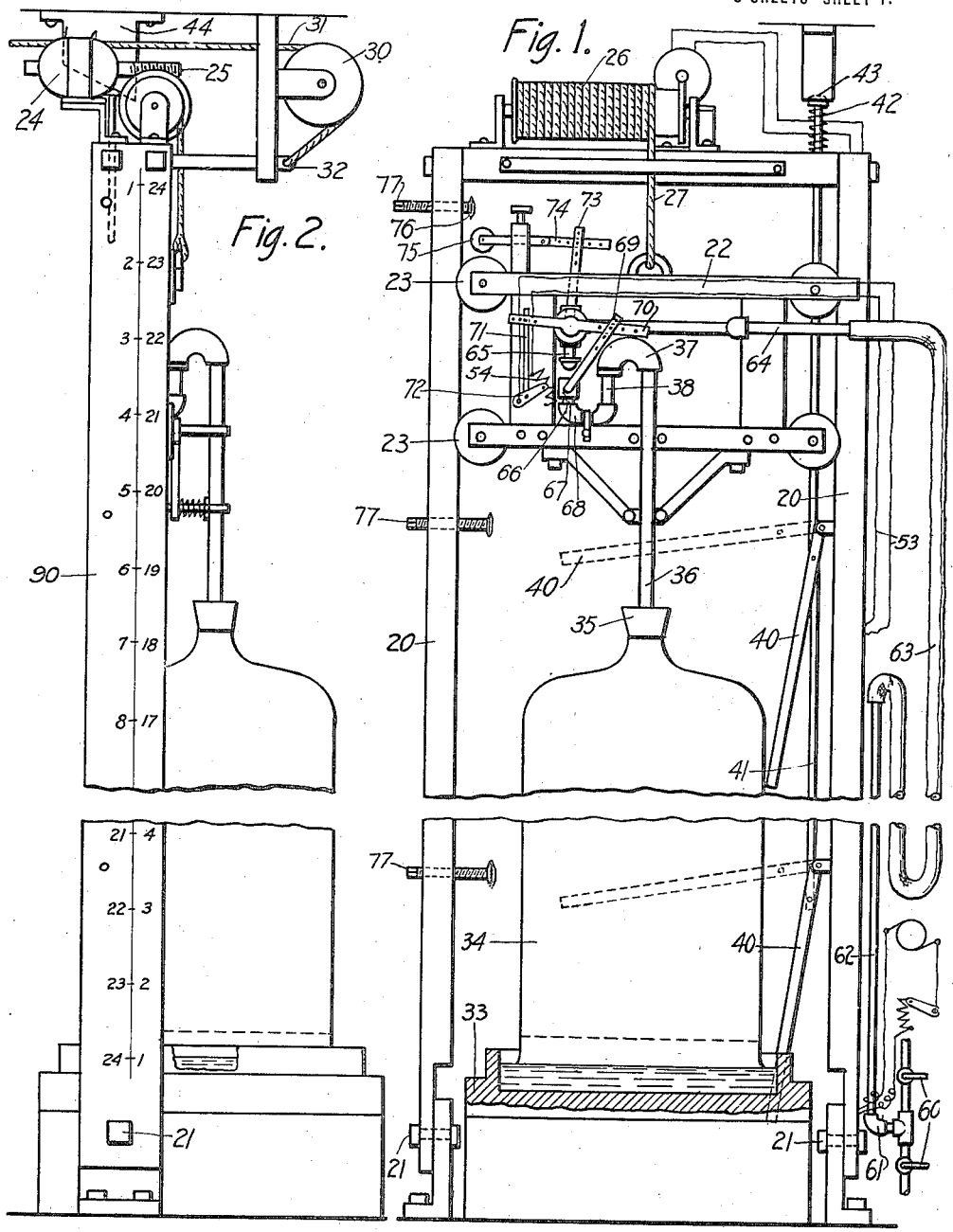

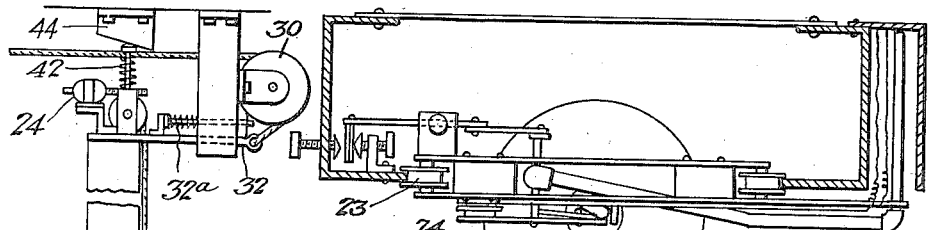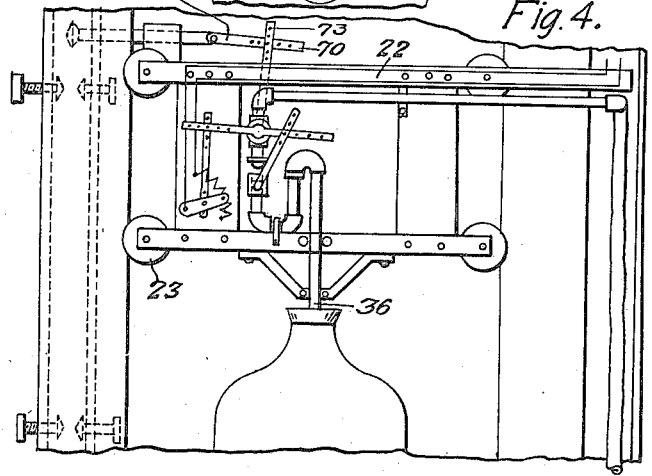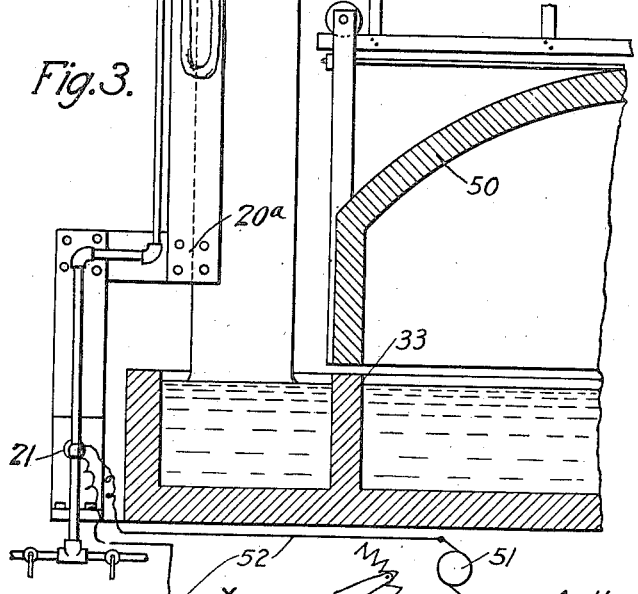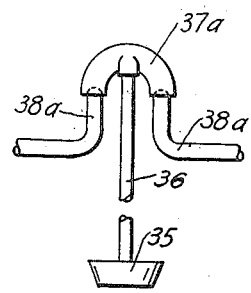

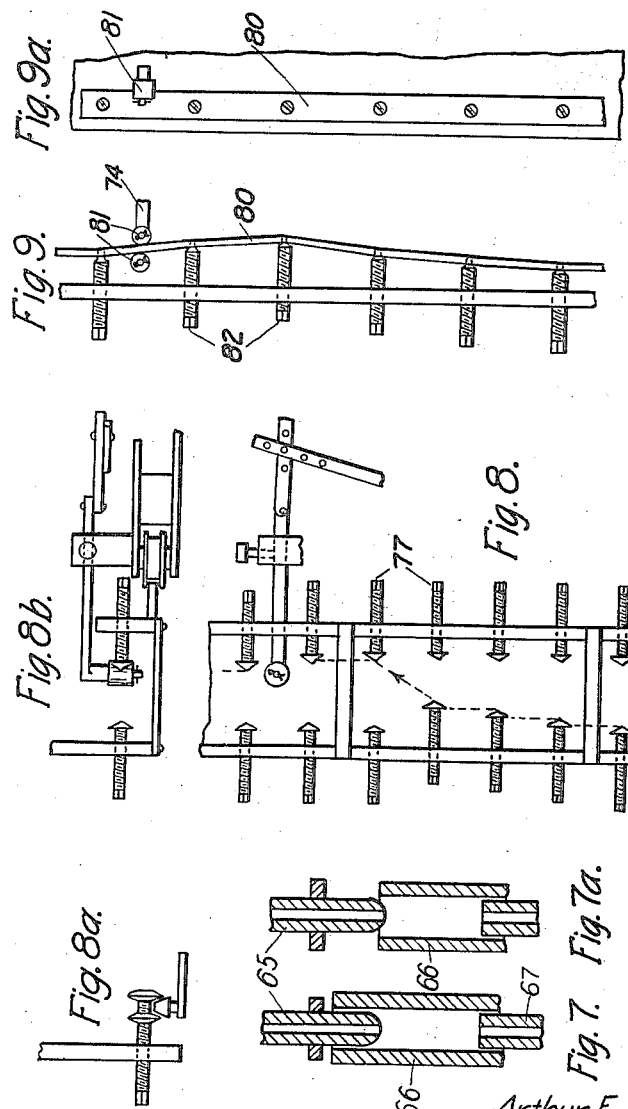
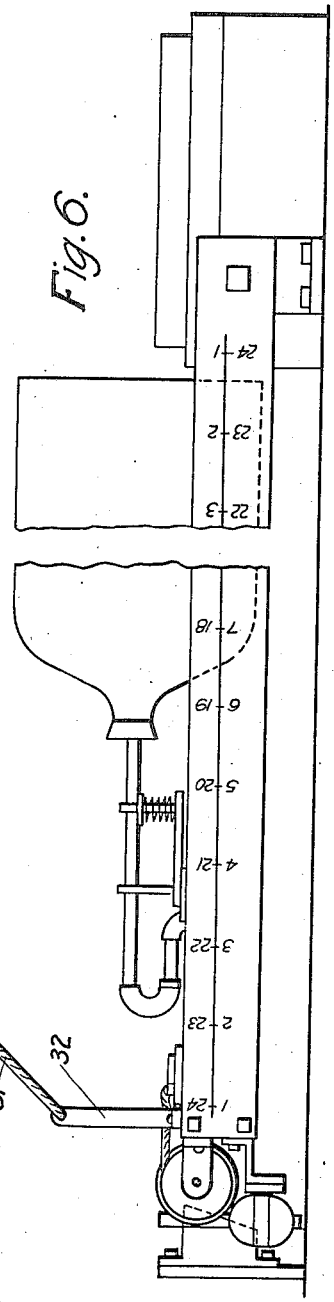

ARTHUR E. SPINASSE, OF MOUNT VERNON, OHIO.

GLASS-DRAWING APPARATUS.

1,343,186.

Specification of Letters Patent.

Patented June 8, 1920.

Original application filed May 24, 1911, Serial No. 629,121. Divided and this application filed April 16, 1914. Serial No. 832,315.

*To all whom it may concern:*

Be it known that I, ARTHUR E. SPINASSE, a citizen of the United States, residing at Mount Vernon, in the county of Knox and State of Ohio, have invented certain new and useful Improvements in Glass-Drawing Apparatus, of which the following is a specification.

This invention relates to improvements in glass drawing apparatus and the process and has among its objects to provide a means for drawing glass cylinders from a pot or tank of molten glass and handling such cylinders in a very efficient manner with very little breakage.

This case is a division of my application Serial No. 629,121, filed May 24, 1911, entitled Glass drawing apparatus, and my present invention relates to certain features among which are, a relation of simultaneous control between the quantity controlling air valve and the pressure controlling means; variable automatic simultaneous control of speed of draw and feed of air in the drawing device; the pivoted tilting frame for taking down a cylinder and the bait supported thereon so as to swing on a pivot parallel to the frame pivot; an air conducting support for the bait provided with laterally extending projections; besides other features.

In the drawings, Figure 1 is a front elevation.

Fig. 2 is a side elevation showing the measuring scale hereinafter referred to.

Fig. 3 is another side view of the apparatus, showing my tilting frame projecting above the zone of draw.

Fig. 4 is a top view of the apparatus.

Fig. 5 is a detail front elevation showing means for effecting my simultaneous automatic control of speed of draw and feed of air.

Fig. 5ª shows means for supporting the bait to swing on a horizontal axis.

Fig. 6 is a side view showing the apparatus of Fig. 3, in its horizontal position after the cylinder has been lowered to such position.

Figs. 7 and 7ª are detail sectional views of part of the connections between the air supply pipe and the pipe leading to the bait.

Figs. 8, 8ª, and 8ᵇ are detail views of the automatic device for controlling the air pressure and drawing speed.

Figs. 9 and 9ª represent modifications of such automatic control means.

Referring to Fig. 1 the framework of my drawing apparatus is shown as comprising two upright standards 20 which are pivoted at their base at 21 so as to be capable of tilting from the vertical position of Figs. 1 and 2 to the horizontal position of Fig. 6.

The drawing apparatus includes a traveling carriage 22 which has guide rollers 23 running between the vertical supports to guide the carriage in its vertical movements. The carriage is moved by means of a motor 24 having a worm gear connection 25, as shown in Fig. 2, with a windlass 26. Around this windlass extends a rope 27 which is attached to the carriage 22 so that the operation of the motor and windlass raises and lowers the carriage.

Over a stationary pulley 30 there extends a rope 31 which is attached to an arm 32 extending forward from the frame. The giving of slack on this rope 31 permits the entire frame to be tilted downward upon its pivotal points 21, until it assumes the horizontal position shown in Fig. 6, or any oblique position.

Referring to Fig. 1 again, the pot 33 containing the molten glass, is shown, with the glass cylinder 34 extending above the same in its drawn position. The bait 35 of any desired form, is connected by the air pipe 36, to a bent pipe 37 resting upon pipe 38 or, preferably as shown in Fig. 5ª, upon an extension pipe or pipes 37ª which in turn rest upon, and are supported to swing on an axis parallel to the frame axis or pivot up by the air conducting pipe supports 38ª, the ends of said pipe supports 38ª being rounded or otherwise shaped in conformity with the ends of the pipes 37ª, to permit this swinging. This permits the swinging movement of the bait carrying the cylinder so that as the frame is lowered the cylinder comes gradually to rest upon the arms 40 on said frame, the pipe 36 or handle coming against and resting upon spring support X. This reduces shock and permits adjustment according to the size of the cylinder in swinging down.

It is desirable to have some means for supporting the glass cylinder during its downward tilting movement. For this purpose I provide the tilting frame provided with the movable cylinder supporting arms 40 which, connected to the operating rod 41, are arranged to swing in and support the cylinder during the downward movement of the tilting frame. The rod 41 provided with spring 42 and head 43 is pushed when it engages plate 44 so as to swing arms 40 into cylinder supporting position. I may, however, provide instead, supports X throughout of a size adapted to the cylinder.

The taking down frame may be of the angular shape shown in Fig. 3 so that it may be tilted to position over the tank 33 after hood 50 has been withdrawn, though it obviously is adaptable to receptacles of any form.

A generator 51 supplies current through conductors 52, 53 to the motor 24, suitable controllers and switches being, of course, provided.

The means for putting speed of draw and supply of air in controlled relation to each other, as well as the means for putting air supply and air pressure in cylinder in controlled relation to each other, may now be explained.

Air supply and control pipes 60 (Fig. 1) lead to a common joint 61 at the lower part of the apparatus. From there a vertical pipe 62 leads up to a central point of the frame, from whence a flexible tube 63 extends upward to a pipe 64 mounted on the drawing carriage 22. The purpose of the flexibility of the pipe 63 and of the aforesaid electric wires 53, is to permit the up and down movements of the drawing carriage and at the same time retain the connection of the electric wires and of the air supply pipes in any position of the carriage.

The aforesaid air pipe 64 is connected with a delivery pipe 65 which extends downward into proximity with a slip collar 66 which fits down over the upper end of the pipe 67 extending upward from a pipe 68 which is connected with the previously described pipe 38. This slip collar 66 is shown in detail in Figs. 7 and 7ᵃ. It is attached to link 69 which is adjustably pinned to a cross arm 70 fixed to a valve in the air conduit. This arm 70 may be located so as to be within reach of the operator for adjustment of the handle or arm 70 whether manual or automatic. Such adjustment will effect corresponding adjustment of the collar or sleeve 66, and vice versa. This cross arm 70 may also be connected to the speed of draw-controlling devices and is at its other end attached to link 71 which extends downward to the rheostat arm 72. This arm 72 and connected parts may also be within easy reach of the operator. From the center portion of the cross arm 70 an operating link 73 extends upward, and is attached to a sliding arm 74 to the outer end of which is pinned the operating roller 75. This operating roller is acted upon by the beveled or cam-shaped heads 76 of adjustable pins 77 which are carried by the side support 20 of the frame. Means whether manual or automatic, for effecting independent control of speed of draw, and means for effecting independent control of air supply, are regarded as features of my case Serial No. 629,121 above referred to.

In Fig. 8 a number of these pins 77 are shown and the operation of these parts is as follows:

When the drawing carriage 22 is lifted upward, the air pressure within the cylinder is controlled through the air pipes 62, 63, 64, and 65. In Fig. 1, the slip collar 66 is shown out of contact with the overlying pipe 65, but more or less air may be forced down through the pipe 65, into the pipes 67, 68, 38, 37 and into the interior of the glass cylinder. The depth to which the pipe 65 extends into the movable collar 66, as shown in Figs. 7 and 7ᵃ, controls the effect of the air pressure or suction, as to the transmission of the same into the interior of the cylinder. That is, when the collar is in its lower position of Fig. 7ᵃ, the effect would not be so pronounced as when the parts are more closely coupled as in Fig. 7 the connection or joint being loose as shown.

Now the extent of movement or of coupling of the collar 66 to the pipe 65, is controlled by the rocking of the cross arm 70. When the right-hand end of the cross arm 70 (Fig. 1), is lifted, the collar 66 is lifted, whereby air pressure in the cylinder is increased as the quantity of air supplied is increased. Similarly the lowering of this right-hand end of the cross arm 70 puts the parts into position shown in Fig. 7ᵃ, or Fig. 1, and correspondingly regulates the pressure.

Similarly as to the opposite end of said cross arm 70, the raising and lowering of the arm, operates through the link 71 to control the rheostat 54, and this operates the motor 24 with greater or less speed. The result is thereby to cause the lifting of the drawing carriage at greater or less speed, which is a thing which has to be done in the drawing of cylinders in this manner to get the necessary conditions of thickness, etc. to the glass cylinder.

All this control of the air supply and drawing speed may be automatically effected by the carriage itself, according to its position. This is effected by a controller and takes place in the following manner. The adjustable pins 77 which constitute the controller and form the contour of a cam are set at different places on the supporting frame 20 and are screwed horizontally in or out so as to bring their operating heads 76 into different alinement with the operating roller 75. Thus when said roller strikes one or the other of said cam-heads 76, the arm 74 is automatically thereby adjusted horizontally. This moves the controlling arm 73 back and forth so as to rock the cross arm 70 about its central pivotal point.

I thus establish mutual control between speed of draw and feed of air.

In Figs. 9 and 9ª, a modified form of this automatic controlling device or cam is shown, in the shape of a continuous flexible band 80 upon the opposite faces of which there impinge two rollers 81 connected with aforesaid operating arm 74. The vertical position of this band is controlled by adjustable set pins 82, so that the band may be given various shapes, one of which is shown in Fig. 9. Thus as the drawing carriage ascends, the flexible band 80 causes the rollers 81 to draw the arm 74 horizontally backward and forward to secure the necessary control of the lifting speed or the air pressure. It will of course be understood that the band 80 is intended to be of sufficient rigidity of structure to operate the controlling arm 74 in this manner but at the same time to be capable of flexure by the pins 82 for the purposes mentioned.

It may be stated that the point of adjustment of the air supply pipe 60 at the pin 61, also the point of adjustment of the lead wires 52, to the frame, is at approximately the pivotal point 21 of said frame so that the tilting of the frame from vertical to horizontal position may take place without affecting these electric wires or air supply pipes.

I have shown two forms of devices, one for drawing glass from a pot, and the other for drawing glass from a tank. The latter is shown in Fig. 3. In this the lower portion of the frame is so constructed, and the angle is such, that though fulcrumed outside the tank, the frame projects over the glass in the tank, as indicated at 20ª. One important feature which is characteristic of a frame of this shape, is that when the frame is lowered to horizontal position it will rest far enough away from the furnace to afford a safe distance from the drawing pot for further treatment of the glass.

While the forms of mechanism herein shown constitutes a preferred form of embodiment of the improvements, it is to be understood that the invention is not limited to the precise details of construction, continuation and operation herein shown and described but it is capable of embodiment in other forms coming within the scope of the claims which follow.

What is claimed is as follows:

1. In apparatus for drawing glass cylinders, in combination, a drawing device, a pivoted frame upon which said device is mounted, an air conduit, a bait, a pipe leading to the bait, branches provided with openings, on said pipe, and sockets provided with openings, at the end of the conduit, the arrangement being such that the bait, when hung by its branches in said sockets, is supported to swing about a line parallel to the line of the frame pivot, at the same time affording passage of air from the conduit to the bait.

2. An apparatus for drawing glass cylinders, said apparatus comprising a drawing element, an air supply conduit leading to said element, said conduit provided at its end with air conducting supports for said bait, a hollow bait, and a pipe therefor constructed with laterally extending air conducting projections, whereby said pipe may be removably sustained upon said supports, and, through said supports and projections, make air connections with said conduit.

3. In an apparatus for drawing glass cylinders, a frame pivoted to swing on a horizontal axis, a bait, and a movable support for the bait carried by the frame and arranged to constrain the bait to swinging movement with respect to the frame on an axis substantially parallel to the frame pivot.

4. In an apparatus for drawing glass cylinders, a frame pivoted to swing on a horizontal axis, a bait, and a movable support for the bait carried by the frame and arranged to act as an air conduit to the bait and at the same time to constrain the bait to swinging movement with respect to the frame on an axis parallel to the frame.

5. In an apparatus of the character described, a tiltable frame, a bait, and means forming a movable support for the bait in connection with the frame to permit the bait to swing with respect to the frame, said means being arranged to limit such swinging movement to a direction approximately at right angles to the frame.

In testimony whereof I hereby affix my signature in presence of two witnesses.

ARTHUR E. SPINASSE.

Witnesses:
  Louis Dethier,
  P. L. Walker.